US011226796B2

(12) United States Patent
Schaude

(10) Patent No.: US 11,226,796 B2
(45) Date of Patent: Jan. 18, 2022

(54) OFFLINE INTEGRATION FOR CLOUD-BASED APPLICATIONS

(71) Applicant: SAP SE, Walldorf (DE)

(72) Inventor: Horst Schaude, Kraichtal (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/866,535

(22) Filed: May 4, 2020

(65) Prior Publication Data
US 2021/0342127 A1    Nov. 4, 2021

(51) Int. Cl.
*G06F 8/36* (2018.01)
*G06F 8/41* (2018.01)
*G06F 8/30* (2018.01)

(52) U.S. Cl.
CPC .............. *G06F 8/36* (2013.01); *G06F 8/31* (2013.01); *G06F 8/41* (2013.01)

(58) Field of Classification Search
CPC ..... G06F 8/30; G06F 8/31; G06F 8/36; G06F 8/40–52
USPC ................. 717/106–108, 136–161
See application file for complete search history.

(56) References Cited

U.S. PATENT DOCUMENTS

| 8,997,070 | B2* | 3/2015 | Klemenz | G06F 8/427 717/143 |
| 9,910,663 | B1* | 3/2018 | Biear | H04L 67/34 |
| 10,078,510 | B1* | 9/2018 | Powers | G06F 8/71 |
| 10,817,272 | B2* | 10/2020 | Kumar N | G06F 8/51 |
| 2006/0004675 | A1* | 1/2006 | Bennett | G06Q 10/08345 705/402 |
| 2013/0159981 | A1* | 6/2013 | Klemenz | G06F 8/47 717/143 |
| 2018/0165068 | A1* | 6/2018 | Kumar N | G06F 8/51 |

(Continued)

OTHER PUBLICATIONS

Ben Lazreg, Amel, et al., A Novel Cloudlet-based Communication Framework for Resource-Constrained Devices, Proceedings of the First International Conference on Data Science, E-learning and Information Systems, Oct. 2018, pp. 1-6, [retrieved on Sep. 10, 2021], Retrieved from the Internet: <URL:http://dl.acm.org/>.*

(Continued)

*Primary Examiner* — Geoffrey R St Leger
(74) *Attorney, Agent, or Firm* — Mintz Levin Cohn Ferris Glovsky and Popeo, P.C.

(57) ABSTRACT

A method may include generating, based on a first programming code implementing a routine in a first programming language, a second programming code implementing the routine in a second programming language associated with an offline runtime environment and a third programming code implementing the routine in a third programming language associated with an online runtime environment. The routine may include a first operation and a second operation associated with a cloud-based software application. The first operation may be capable of being performed while the cloud-based software application is operating in an offline mode but the second operation may be incapable of being performed while the cloud-based software application is operating in the offline mode. The second second programming code being generated to include the first operation and exclude the second operation. The second programming code and the third programming code may be deployed to a client.

18 Claims, 14 Drawing Sheets

(56) References Cited

U.S. PATENT DOCUMENTS

2018/0189038 A1\* 7/2018 Hart .......................... G06F 8/76

OTHER PUBLICATIONS

Hashizume K. et al., Cloud Service Model Patterns, PLoP '12: Proceedings of the 19th Conference on Pattern Languages of Programs, Oct. 2012, pp. 1-14, [retrieved on Sep. 10, 21], Retrieved from the Internet: <URL:http://dl.acm.org/>.\*

\* cited by examiner

```
var myOppId   : BusinessTransactionDocumentID;

if ( ! this.ToOppItem. IsSet() ) {
    myOppId.content = "55804";
    this.ToOppItem = Opportunity.Retrieve(myOppId).Item.GetFirst();
}
```

```
let myOppId = await DataType[Namespace.AP.Common.GDT].BusinessTransactionDocumentID;
if(await not(this.ToOppItem.exists())){
    await set(myOppId.content, "55804");
    await set(this. ToOppItem, BusinessObject.Opportunity.retrieve(myOppId).Item.getFirst());
}
```

```
IF _this_1 IS INITIAL.
  CLEAR _assocTOOPPITEM5C2E79171BDA_3.
ELSE.
  _assocTOOPPITEM5C2E79171BDA_3 ?= GET_1_ASSOCIATION (
    IV_SOURCE_BO_NAME      = 'YBZT28XUY_SILE7F9F64F1BAEA5145'
    IV_SOURCE_NODE_NAME    = 'ROOT4F9038552100031B0'
    IV_NODE_ID             = CONV #( _this_1->node_id )
    IV_ASSOCIATION         = 'TOOPPITEM5C2E"97171RDA8D0' ).
ENDIF.
DATA_result_4 TYPE PDI_ABSL_BOOLEAN.
_result_4 = boolc( _assocTOOPPITEM5C2E79171BDA_3 IS NOT INITIAL ).
IF NOT _result_4 = abslc_true .
myOppId_2-CONTENT = '55804'.
DATA _retrieve_5 TYPE REF TO IF_APCRM_OPPORTUNITY=>TY_ROOT .
_retrieve_5 ?= RETRIEVE_SINGLE(
    IV_SOURCE_BO_NAME         = 'OPPORTUNITY'
    IV_SOURCE_NODE_NAME       = 'ROOT'
    IV_SOURCE_KEY_NAME        = 'ID'
    IV_SOURCE_KEY_TYPE_NAME   = 'APC_S_BTD_ID'
    IS_SOURCE_KEY             = myOppId_2
    IV_SOURCE_NODE_CATEGORY   = '4'
).
DATA_assocITEM_6 TYPE STANDARD TABLE OF REF TO IF_APCRM_OPPORTUNITY=>TY_ITEM WITH DEFAULT KEY .

```
From 2C
IF _retrieve_5 IS INITIAL.
  CLEAR _associTEM_6.
ELSE.
  CALL METHOD GET_N_ASSOCIATION
    EXPORTING
      IV_SOURCE_BO_NAME    = 'OPPORTUNITY'
      IV_SOURCE_NODE_NAME  = 'ROOT'
      IV_NODE_ID           = CONV # ( _retrieve_5->node_id )
      IV_ASSOCIATION       = 'ITEM'
    IMPORTING
      ET_TARGET_DATA       = _associTEM_6.
ENDIF.
DATA _line_of_col_7 TYPE REF TO IF_APCRM_OPPORTUNITY=>TY_ITEM .
COLLECTION_GET_FIRST(
  EXPORTING
    IT_TABLE    = _associTEM_6
  IMPORTING
    EG_RESULT   = _line_of_col_7
).
IF _line_of_col_7 IS INITIAL.
  CLEAR _this_1->SAP_TOPITEMCO34BD48BD8C91C3.
ELSE.
  _this_1->SAP_TOPITEMCO34BD48BD8C91C3 = _line_of_col_7->UUID.
ENDIF.
ENDIF.
```

```
this.EXF_Amount.content        =   123.45 + 678.90;
this.EXF_Date                  =   this.EXF_Date.AddDuration( myDuration);
this.EXF_DateTime              =   this.EXF_DateTime.EndofMonth();
this.EXF_IntegerValue          =   42 / 5;
this.EXF_DecimalValue          =   3.1415926 * 10000;
this.EXF_Identifier            =   "0000000666";
this.EXF_Identifier            =   this.EXF_Identifier.RemoveLeadingZeros();
this.EXF_BTDIdentifier.content =   "111";
this.EXF_BTDIdentifier         =   this.EXF_BTDIdentifier.AddLeadingZeros();
this.EXF_Quantity.content      =   567.89 - 666;
this.EXF_ShortText             =   "1234567890" + "<=>" + "1234567890" + "<=>" ± "1234567890";
this.EXF_MediumText            =   "12345678901234567890";
this.EXF_MediumText            =   this.EXF_MediumText.Concatenate("abcdefghijklmnoprstuvwxyz");
```

FIG. 3A

```
await set(this.EXF_Amount.content, add(123.45, 678.9));
await set(this.EXF_Date, this.EXF_Date[Qualifier.LibraryFunction].AddDuration(myDuration));
await set(this.EXF_DateTime, this.EXF_DateTime[Qualifier.LibraryFunction].EndOfMonth());
await set(this.EXF_IntegerValue, divide(42, 5));
await set(this.EXF_DecimalValue, multiply(3.1415926, 10000));
await set(this.EXF_Identifier, "0000000666");
await set(this.EXF_Identifier, this.EXF_Identifier.RemoveLeadingZeros());
await set(this.EXF_BTDIdentifier.content, "111");
await set(this.EXF_BTDIdentifier, this.EXF_BTDIdentifier.AddLeadingZeros());
await set(this.EXF_Quantity.content, subtract(567.89, 666));
await set(this.EXF_ShortText, add(add(add("123456789", "<=>"), "1234567890"), "<=>"), "1234567890"));
await set(this.EXF_MediumText, "12345678901234567890");
await set(this.EXF_MediumText, this.EXF_MediumText.Concatenate("abcdefghijklmnoprstuvwxyz"));
```

FIG. 3B

```
                                                                    340
                                                                   ╱
418  FIELD-SYMBOLS <_auto_114> TYPE APC_5_AMOUNT .
419  ASSIGN COMPONENT 'EXT-YBZT28XUY_POOOEACA72ADOTO6' OF STRDCTURE _this_1->'   TO <_auto_114>.
420  <_auto_114>-CONTENT = ( decfloat34'123.45' + decfloat34'670.90' ).
421  FIELD-SYMBOLS <_auto_115> TYPE ANY.
422  ASSIGN COMPONENT 'EXT-YBZT28XUY_POOOCO31E455EC9A' OF STRDCTURE _this_1->'   TO <_auto_115>.
423  FIELD-SYMBOLS<_auto_116> TYPE ANY .
424  ASSIGN COMPONENT 'EXT-YBZT28XUY_POOOCO31E455EC9A' OF STRDCTURE _this_1->'   TO <_auto_116>.
425  DATA_par_117 TYPE PDI_ASSL_DATE.
426  _par_117 = <_auto_114>.
427  DATA_par_118 TYPE APC_V_DURATION .
428  _par_110 = myDuration_92.
429  ls_paran_bind-name = 'DATE'.
430  GET REFERENCE OF _par_117 INTO ls_paran_bind-value.
431  ls_paran_bind-kind = cl_abap_objectdence=>importing.
432  INJECT ls_paran_bind INTO TABLE lt_paran_bind.
433  ls_paran_bind-name = 'DURATION'.
434  GET REFERENCE OF _par_110 INTO ls_paran_bind-value.
435  ls_paran_bind-kind = cl_abap_objectdence=>importing.
436  INJECT ls_paran_bind INTO TABLE lt_paran_bind.
437  ls_rec_content = GET_RSC_CONTEXT( ).
438  ls_paran_bind-name = 'SAP_CONTENT'.
439  GET REFERENCE OF ls_rec_content INTO ls_paran_bind – value.
440  ls_paran_bind-kind -- cl_abap_objectdence=>importing.
441  INJECT ls_paran_bind INTO TABLE lt_paran_bind.
442  DATA_ret_119 TYPE PDI_ASSL_DATE.
443  Call_reuse_service (
444  EXPORTING
                 → To 3C (CONT'D)
```

FIG. 3C

```
445   ↓ From 3C
446         iv_function_name  = 'PDI_ASSL_DT_DATE_ADO_DURATION'
447         it_parameter      = it_paran_bind
448       IMPORTING
449         it_messages       = it_lib_message
450       CHANGING
451         cg_date           = _ret_119 ).
452       ADO_MESSAGES_TO_MSG_MANDGER( it_messages = it_lib_message ).
453       CLEAR Is_paran_bind.
454       CLEAR It_paran_bind.
455       CLEAR It_lib_message.
456       <_auto_115> = _ret_119.
457       FIELD-SYMBOLS <_auto_120> TYPE ANY.
458       ASSIGN COMPONENT 'EXT-YBZT28XUY_POOO9E4EAOCC334' OF STRDCTURE _this_1->'  TO <_auto_120>.
459       FIELD-SYMBOLS <_auto_121> TYPE ANY.
460       ASSIGN COMPONENT 'EXT-YBZT28XUY_POOO9E4EAOCC332' OF STRDCTURE _this_1->'  TO <_auto_121>.
461       DATA _par_122 TYPE PDI_ASSL_DATE_TIME.
462       _par_122 = <_auto_121>.
463       Is_paran_bind-name = 'DATETIME'.
464       GET REFERENCE OF _par_122 INTO Is_paran_bind-value.
465       Is_paran_bind-kind = c1_abapp_objectdence =>importing.
466       INJECT Is_paran_bind INTO TABLE It_paran_bind.
467       Is_rec_content = CET_ASC_CONTENT().
468       Is_paran_bind-name = 'SAP_CONTENT'.
469       GET REFERENCE OF Is_rec_content INTO Is_paran_bind-value.
470       Is_paran_bind-kind = c1_abapp_objectdence =>importing.
      INJECT Is_paran_bind INTO TABLE It_paran_bind.
   ↓ To 3C (CONT'D)
```

FIG. 3C

```
471  → From 3C
472    DATA _ret_123 TYPE PDI_ADSL_DATE_TIME .
473    call_reuse_service (
474      EXPORTING
475        iv_function_name = 'PDI_ASSL_DT_DT_EXD_OF_MONTH'
476        lt_parameter     = lt_paran_bind
477      IMPORTING
478        lt_message       = lt_lib_massage
479      CHANGING
480        cg_data          = _ret_123 ).
481    ADD_MASSAGES_TO_MSG_ MANDGER ( lt_messages = lt_lib_message ).
482    CLEAR ls_paran_bind.
483    CLEAR lt_paran_bind.
484    CLEAR lt_lib_message.
485    <_auto_120> = _ret_123.
486    FIELD-SYMBOLS <_auto_124> TYPE ANY .
487    ASSIGN COMPONENT 'EXT-YBZT28XUY_POOOCE42992FD4F1' OF STRDCTURE _this_1->' TO <_auto_124>.
488    <_auto_124> = ( 42 / 5 ).
489    FIELD-SYMBOLS <_auto_125> TYPE ANY .
490    ASSIGN COMPONENT 'EXT-YBZT28XUY_POOO21B1A0A94CO' OF STRDCTURE _this_1->' TO <_auto_125>.
491    <_auto_125> = (decfloat34' 3.1415924' = 10000).
492    FIELD-SYMBOLS <_auto_124> TYPE ANY .
493    ASSIGN COMPONENT 'EXT-YBZT28XOY_POOO4F12374EA142' OF STRDCTURE _this_1->' TO <_auto_126>.
494    <_auto_126> = '0000000666'.
495    FIELD-SYMBOLS <_auto_127> TYPE ANY .
       ASSIGN COMPONENT 'EXT-YBZT28XOY_POOO4F12374EA142' OF STRDCTURE _this_1->' TO <_auto_127>.
       → To 3C (CONT'D)
```

FIG. 3C

```
496  From 3C
497       FIELD-SYMBOLS <_auto_128> TYPE ANY .
498       ASSIGN COMPONENT 'EXT-YBZT28XUY_P0004F12374EA142' OF STRDCTURE _this_1->' TO <_auto_128>.
499       DATA _alpha_129 TYPE PDI_ASSL_IDENTIFIER .
700       CALL FUNCTION 'CONVERSION_EXIT_ALPHA_OUTPUT'
701         EXPORTING
702           input  = <_auto_128>
703         IMPORTING
704           output = _alpha_129 .
705       <_auto127> = _alpha – 129.
706       FIELD-SYMBOLS <_auto_130> TYPE APC_5_STD_ID .
707       ASSIGN COMPONENT 'EXT-YBZT28XUY_P000IAOCD34BF140' OF STRDCTURE _this_1->' TO <_auto_130>.
708       <_auto_130> = CONTENT = '111'.
709       FIELD-SYMBOLS <_auto_131> TYPE APC_5_STD_ID .
710       ASSIGN COMPONENT 'EXT-YBZT28XUY_P000IAOCD34BF140' OF STRDCTURE _this_1->' TO <_auto_131>.
711       FIELD-SIXDOLS <_auto_132> TYPE APC_5_STD_ID .
712       ASSIGN COMPONENT 'EXT-YBZT28XUY_P000IAOCD34BF140' OF STRDCTURE _this_1->' TO <_auto_132>.
713       DATA _alpha_133 TYPE APC_5_STD_ID .
714       CALL FUNCTION 'CONVERSION_EXIT_APLHA_INPUT'
715         EXPORTING
716           input  = <_auto_132>=CONTENT
717         IMPORTING
718           output = _alpha_133-CONTENT .
719       MOVE-CORRESPONDING _alpha_133 TO <_auto_131>.
720       FIELD-SYMBOLS <_auto_134> TYPE APC_5_QUANTITY
          ASSIGN COMPONENT 'EXT-YBZT28XUY_P0005FFC87496A2' OF STRDCTURE _this_1->' TO <_auto_134>.
```

↓ From 3C

| | |
|---|---|
| 721 | <_auto_134> = CONTENT = ( decfloat34 '547.89 = 444 ). |
| 722 | FIELD-SYMBOLS <_auto_135> TYPE ANY . |
| 723 | ASSIGN COMPONENT 'EXT-YBZT28XUY_P000FA5A3F7C4EFC' OF STRDCTURE _this_1->' TO <_auto_135>. |
| 724 | <_auto_135 >= '1234567890' " '1234567890' '' ' <=>' " '1234567890'. |
| 725 | FIELD-SYXMLS <_auto_136> TYPE ANY . |
| 726 | ASSIGN COMPONENT 'EXT-YBZT28XUY_P00017CBDIB02F23' OF STRDCTURE _this_1->' TO <_auto_136>. |
| 727 | <_auto_136 = '12345678901234567890'. |
| 728 | FIELD-SYMBOLS <_auto_137> TYPE ANY . |
| 729 | ASSIGN COMPONENT 'EXT-YBZT28XUY_P00017CBDIB02F23' OF STRDCTURE _this_1->' TO <_auto_137>. |
| 730 | FIELD-SYMBOLS <_auto_138> TYPE ANY . |
| 731 | ASSIGN COMPONENT 'EXT-YBZT28XUY_P00017CBDIB02F23' OF STRDCTURE _this_1->' TO <_auto_138>. |
| 732 | DATA_par_139 TYPE PDI_ASSL_STRING. |
| 733 | _par_139 = 'abcdefghijklmnopqrstuvwxyz'. |
| 734 | DATA_result_140 TYPE PDI_ASSL_STRING. |
| 735 | _result_140 = CL_PDI_SPM_AS_METHOD_UTIL=>string_concatenate ( |
| 736 | iv_retrieve1 = <_auto_138> |
| 737 | iv_retrieve1 = _par_139 ). |
| 738 | <auto_137> = _result_140. |

340

OFFLINE INTEGRATION FOR CLOUD-BASED APPLICATIONS

TECHNICAL FIELD

The subject matter described herein relates generally to cloud computing and more specifically to generating programming code for offline operation a cloud-based application.

BACKGROUND

Many enterprises may rely on enterprise software applications to provide solutions for billing, invoicing, procurement, payroll, time and attendance management, recruiting and onboarding, learning and development, performance and compensation, workforce planning, and/or the like. Examples of enterprise software applications may include enterprise resource planning (ERP) software, customer relationship management (CRM) software, and/or the like. To provide access to multiple end users, who may often be geographically disparate, enterprise software applications may be hosted on a cloud-computing platform such that the functionalities of the enterprise software applications are available for remote access. For instance, some enterprise software applications may be deployed as a cloud-based service including, for example, a software as a service (SaaS) and/or the like.

SUMMARY

Systems, methods, and articles of manufacture, including computer program products, are provided for generating programming code for offline operation a cloud-based application. In one aspect, there is provided a system. The system may include at least one data processor and at least one memory. The at least one memory may store instructions that result in operations when executed by the at least one data processor. The operations may include: generating, based at least on a first programming code implementing a routine in a first programming language, a second programming code implementing the routine in a second programming language associated with an offline runtime environment, the routine including a first operation and a second operation associated with a cloud-based software application, the first operation being capable of being performed while the cloud-based software application is operating in an offline mode, the second operation being incapable of being performed while the cloud-based software application is operating in the offline mode, and the second programming code being generated to include the first operation and exclude the second operation; and deploying, to a client, the second programming code to at least enable the routine to be executed at the client as part of the cloud-based software application operating in the offline mode.

In some variations, one or more features disclosed herein including the following features may optionally be included in any feasible combination. The first operation may be included in the second programming code based at least on a white list identifying the first operation as being capable of being performed in the offline mode.

In some variations, the second operation may be excluded from the second programming code based at least on a black list identifying the second operation as incapable of being performed in the online mode.

In some variations, the first programing language may be an Advanced Business Scripting Language (ABSL).

In some variations, the second programming language may be JavaScript. The offline runtime environment may be a JavaScript runtime environment.

In some variations, a third programming code implementing the routine in a third programming language associated with an online runtime environment may be generated based at least on the first programming code implementing the routine in the first programming language. The third programming code may be deployed to the client to at least enable the routine to be executed at the client as part of the cloud-based software application operating in an online mode.

In some variations, the third programming language may be an Advanced Business Application Programming (ABAP) language. The online runtime environment may be an Advanced Business Application Programming (ABAP) runtime environment.

In some variations, a network connection to access one or more remote resources may not be required while the cloud-based software application is operating in the offline mode.

In some variations, the first operation may be an arithmetic operation, a logical operation, a programming operation, and/or an enterprise specific operation.

In some variations, the second programming code may be generated as part of compiling the first programming code.

In another aspect, there is provided a method for generating programming code for offline operation a cloud-based application. The method may include: generating, based at least on a first programming code implementing a routine in a first programming language, a second programming code implementing the routine in a second programming language associated with an offline runtime environment, the routine including a first operation and a second operation associated with a cloud-based software application, the first operation being capable of being performed while the cloud-based software application is operating in an offline mode, the second operation being incapable of being performed while the cloud-based software application is operating in the offline mode, and the second programming code being generated to include the first operation and exclude the second operation; and deploying, to a client, the second programming code to at least enable the routine to be executed at the client as part of the cloud-based software application operating in the offline mode.

In some variations, one or more features disclosed herein including the following features may optionally be included in any feasible combination. The first operation may be included in the second programming code based at least on a white list identifying the first operation as being capable of being performed in the offline mode.

In some variations, the second operation may be excluded from the second programming code based at least on a black list identifying the second operation as incapable of being performed in the online mode.

In some variations, the first programing language may be an Advanced Business Scripting Language (ABSL).

In some variations, the second programming language may be JavaScript. The offline runtime environment may be a JavaScript runtime environment.

In some variations, the method may further include: generating, based at least on the first programming code implementing the routine in the first programming language, a third programming code implementing the routine in a third programming language associated with an online runtime environment; and deploying, to the client, the third programming code to at least enable the routine to be executed at the client as part of the cloud-based software application operating in an online mode.

In some variations, the third programming language may be an Advanced Business Application Programming (ABAP) language. The online runtime environment may be an Advanced Business Application Programming (ABAP) runtime environment.

In some variations, a network connection to access one or more remote resources may not be required while the cloud-based software application is operating in the offline mode.

In some variations, the first operation may be an arithmetic operation, a logical operation, a programming operation, and/or an enterprise specific operation.

In some variations, the second programming code may be generated as part of compiling the first programming code.

In another aspect, there is provided a computer program product that includes a non-transitory computer readable storage medium. The non-transitory computer-readable storage medium may include program code that causes operations when executed by at least one data processor. The operations may include: generating, based at least on a first programming code implementing a routine in a first programming language, a second programming code implementing the routine in a second programming language associated with an offline runtime environment, the routine including a first operation and a second operation associated with a cloud-based software application, the first operation being capable of being performed while the cloud-based software application is operating in an offline mode, the second operation being incapable of being performed while the cloud-based software application is operating in the offline mode, and the second programming code being generated to include the first operation and exclude the second operation; and deploying, to a client, the second programming code to at least enable the routine to be executed at the client as part of the cloud-based software application operating in the offline mode.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to generating an offline runtime environment for a cloud-based software application, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2C depicts an example of programming code implementing a routine for offline execution, in accordance with some example embodiments;

FIG. 3A depicts another example of programming code implementing a routine, in accordance with some example embodiments;

FIG. 3B depicts another example of programming code implementing a routine for online execution, in accordance with some example embodiments;

FIG. 3C depicts another example of programming code implementing a routine for offline execution, in accordance with some example embodiments;

When practical, similar reference numbers denote similar structures, features, or elements.

DETAILED DESCRIPTION

Figure 1:
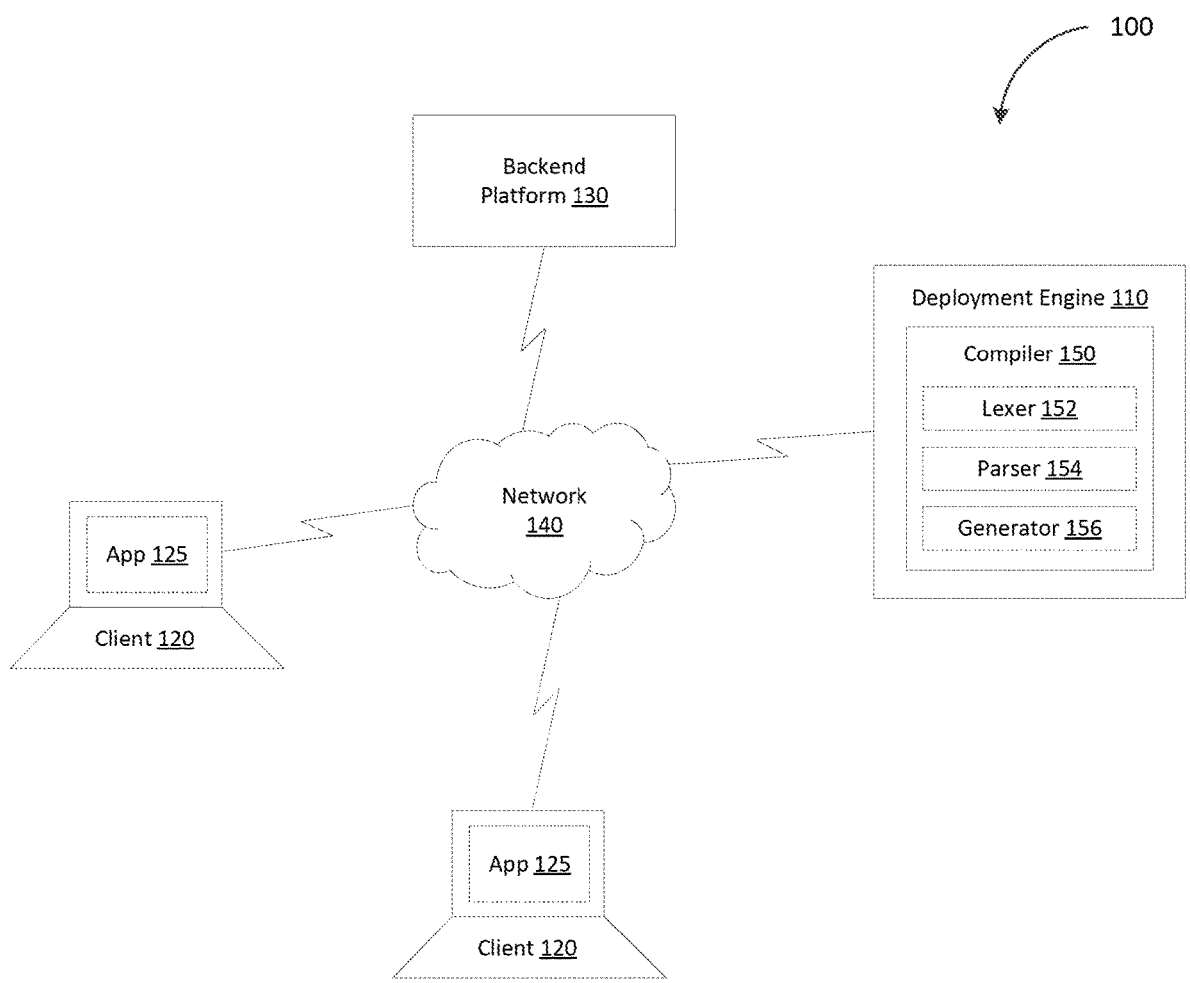
FIG. 1 depicts a system diagram illustrating an example of a cloud computing system, in accordance with some example embodiments.

A conventional cloud-based software application may rely on remote resources including, for example, data storage, computing power, and/or the like. As such, a conventional cloud-based software application may be unable to operate in an offline mode at least because an active network connection may be required to access the remote resources. This inability to operate in an offline mode may prevent a conventional cloud-based software application from being available in mobile settings such as, for example, on mobile devices that may not have a consistent network connection. Accordingly, in some example embodiments, a cloud-based software application may be configured to operate in an offline mode. For example, when operating in the offline mode, the cloud-based software application may not require an active network connection to access remote resources such as data storage, computing power, and/or the like.

An end user may customize the cloud-based software application by adding, to the cloud-based software application, one or more end user specific functionalities. For example, the one or more functionalities may be added by at least implementing a corresponding routine, which may be a sequence of programming code that may be executed to realize the one or more functionalities. The routine may be implemented in a first programming language (e.g., an Advanced Business Scripting Language (ABSL) and/or the like). However, the cloud-based software application may execute in a different runtime environment when the cloud-based software application is operating in the offline mode than when the cloud-based software application is operating in the online mode. As such, the routine implemented in first programming language may require transformation into a second programming language (e.g., JavaScript and/or the like) for execution in an offline runtime environment and a third programming language (e.g., an Advanced Business Application Programming (ABAP) language and/or the like) for execution in an online runtime environment.

In some example embodiments, a deployment engine may be configured to generate, based at least on a first programming code implementing the routine in the first programming language, a second programming code implementing the routine in a second programming language for offline execution and/or a third programming code implementing the routine in a third programming language for online execution. Moreover, the deployment engine may generate the second programming code to exclude one or more operations included in the routine that are incapable of being performed in the offline mode.

The routine customizing the cloud-based software application may include one or more operations that cannot be performed in the offline mode. For example, an operation requiring a network connection to access one or more remote resources (e.g., data storage, computing power, and/or the like) may not be performed while the cloud-based software application is operating in the offline mode. As such, in some example embodiments, the deployment engine may be configured to determine whether each operation included in the routine may be performed in the offline mode. One or more operations that cannot be performed in the offline mode may be excluded from the second programming code implementing the routine in the second programming language for offline execution. Accordingly, the same first programming code implementing the routine in the first programming language may be used to generate the second programming code implementing the routine in the second programming language for offline execution as well as the third programming code implementing the routine in the third programming language for online execution.

FIG. 1 depicts a system diagram illustrating an example of a cloud computing system 100, in accordance with some example embodiments. Referring to FIG. 1, the cloud computing system 100 may include a deployment engine 110, a client 120, and a backend platform 130. The deployment engine 110, the client 120, and the backend platform 130 may be communicatively coupled via a network 140. The network 140 may be a wired network and/or a wireless network including, for example, a local area network (LAN), a virtual local area network (VLAN), a wide area network (WAN), a public land mobile network (PLMN), the Internet, and/or the like.

As shown in FIG. 1, an application 125 at the client 120 may be a cloud-based software application associated with the backend platform 130. The application 125 may operate in an online mode as well as in an offline mode. The application 125 operating in the online mode may require an active network connection to the backend platform 130. For example, while operating in the online mode, the application 125 may access, via the network 140, one or more remote resources (e.g., data storage, computing power, and/or the like) provided by the backend platform 130. Alternatively, the application 125 may also operate in the offline mode, in which case the application 125 may operate without an active network connection to the backend platform 130. For instance, while in the offline mode, the application 125 may operate without accessing, via the network 140, the remote resources provided by the backend platform 130.

The application 125 may be customized by the addition of one or more end user specific functionalities. For example, the one or more functionalities may be added by at least implementing a corresponding routine, which may be a sequence of programming code that may be executed to realize the one or more functionalities. Accordingly, a first programming code may implement the routine in a first programming language such as, for example, an Advanced Business Scripting Language (ABSL) and/or the like. However, the application 125 may execute in a different runtime environment when the application 125 is operating in the offline mode than when the application 125 is operating in the online mode. For instance, while the application 125 is operating in the online mode, the application 125 may be executing in an online runtime environment (e.g., an Advanced Business Application Programming (ABAP) runtime environment and/or the like) running at the backend platform 130. Contrastingly, while the application 125 is operating in the offline mode, the application 125 may be executing in an offline runtime environment (e.g., a JavaScript runtime environment and/or the like) running at the client 120.

As such, in some example embodiments, the deployment engine 110 may transform the first programming code implementing the routine in the first programming language prior to deploying the first programming code to the client 120 where the first programming code may be executed as part of the application 125 in an online mode as well as in an offline mode. For example, the deployment engine 110 may transform the first programming code in the first programming language into a second programming code in a second programming language (e.g., JavaScript and/or the like) for execution in the offline runtime environment (e.g., a JavaScript runtime environment and/or the like) running at the client 120. Alternatively and/or additionally, the deployment engine 110 may transform the first programming code in the first programming language into a third programming code in a third programming language (e.g., an Advanced Business Application Programming (ABAP) language and/or the like) for execution in the online runtime environment (e.g., an Advanced Business Application Programming (ABAP) runtime environment and/or the like) running at the backend platform 130.

Referring to again to FIG. 1, the deployment engine 110 may include at least one compiler 150 configured to transform the first programming code in the first programming code including by compiling and/or transpiling the first programming code. As shown in FIG. 1, the compiler 150 may include a lexer 152, a parser 154, and a generator 156.

According to some example embodiments, the lexer 152 may be configured to perform a lexical analysis that includes identifying one or more tokens present in the first programming code. It should be appreciated that each token included in the first programming code may correspond to a string having a predetermined meaning in the first programming language. As such, once the lexer 152 tokenizes the first programming code, the parser 154 may generate, based on the tokens included in the first programming code, a data structure (e.g., a parse tree, an abstract syntax tree, and/or the like) providing a hierarchical representation of the first programming code. The generator 156 may be configured to generate, based at least on the data structure generated by the parser 154, the second programming code in the second programming language and/or the third programming code in the third programming language.

The routine customizing the application 125 may include operations that can be performed in the offline mode as well as operations that cannot be performed in the offline mode. For example, an operation requiring a network connection to access one or more remote resources (e.g., data storage, computing power, and/or the like) at the backend platform 130 may not be performed while the application 125 is operating in the offline mode. Contrastingly, an operation that may be performed without a network connection to access the one or more remote resources at the backend platform 130 may still be performed while the application 125 is operating in the offline mode. Examples of operations the application 125 is capable of performing in the offline mode may include arithmetic operations, logical operations, programming operations, enterprise specific operations, and/or the like.

As such, in some example embodiments, the deployment engine 110, for example, the parser 154 included in the compiler 150, may be configured to determine whether each operation included in the routine may be performed in the offline mode. For instance, as part of parsing the first programming code implementing the routine, the parser 154 may determine, based at least on a black list of operations that cannot be performed in the offline mode and/or a white list of operations that can be performed in the offline mode, whether each operation included in the first programming code may be performed in the offline mode.

The generator 156 may, as noted, generate the second programming code to implement in the second programming language for executing the application 125 at the client 120 in the offline mode. In some example embodiments, the generator 156 may exclude, from the second programming code, the one or more operations that the parser 154 identified as being incapable of being performed in the offline mode. For example, the generator 156 may generate the second programming code to include a first operation that can be performed in the offline mode but exclude a second operation that cannot be performed in the offline mode. Contrastingly, the generator 156 may generate the third programming code, which may implement the routine in the third programming language for execution in the online mode, to include operations that can be performed in the offline mode as well as operations that cannot be performed in the offline mode. Because the compiler 150 is able to differentiate between operations that can be performed in the offline mode and operations that cannot be performed in the offline mode, the same first programming code implementing the routine in the first programming language may be used to generate the second programming code implementing the routine in the second programming language for offline execution as well as the third programming code implementing the routine in the third programming language for online execution.

Figure 2A:
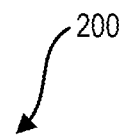
FIG. 2A depicts an example of programming code implementing a routine, in accordance with some example embodiments.
Figure 2B:
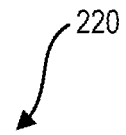
FIG. 2B depicts an example of programming code implementing a routine for online execution, in accordance with some example embodiments.

To further illustrate, FIG. 2A depicts an example of a first programming code 200 implementing a routine for setting an association, in accordance with some example embodiments. Referring to FIG. 2A, the first programming code 200 may implement the routine in a first programming language (e.g., an Advanced Business Scripting Language (ABSL) and/or the like). In some example embodiments, the compiler 150 may transform the first programming code 200 to a second programming code 220 shown in FIG. 2B, which implements the same routine in a second programming language (e.g., JavaScript and/or the like) for execution in an offline runtime environment (e.g., a JavaScript runtime environment and/or the like) running at the client 120. The compiler 150 may generate the second programming code 220 to exclude one or more operations from the first programming code 200 based at least on the one or more operations being incapable of being performed in the offline mode.

Alternatively and/or additionally, the compiler 150 may transform the first programming code 200 to a third programming code 240 shown in FIG. 2C, which implements the same routine in a third programming language (e.g., an Advanced Business Application Programming (ABAP) language and/or the like) for execution in an online runtime environment (e.g., an Advanced Business Application Programming (ABAP) runtime environment and/or the like) running at the backend platform 130.

FIG. 3A depicts another example of a first programming code 300 implementing a routine that performs one or more arithmetic operations and string operations, in accordance with some example embodiments. Referring to FIG. 3A, the first programming code 300 may implement the routine in a first programming language (e.g., an Advanced Business Scripting Language (ABSL) and/or the like).

In some example embodiments, the compiler 150 may transform the first programming code 300 to a second programming code 320 shown in FIG. 3B, which implements the same routine in a second programming language (e.g., JavaScript and/or the like) for execution in an offline runtime environment (e.g., a JavaScript runtime environment and/or the like) running at the client 120. The second programming code 320 may exclude operations that are present in the first programming code 300 but cannot be performed in an offline mode. Alternatively and/or additionally, the compiler 150 may transform the first programming code 300 to a third programming code 340 shown in FIG. 3C, which implements the same routine in a third programming language (e.g., an Advanced Business Application Programming (ABAP) language and/or the like) for execution in an online runtime environment (e.g., an Advanced Business Application Programming (ABAP) runtime environment and/or the like) running at the backend platform 130.

Figure 4:
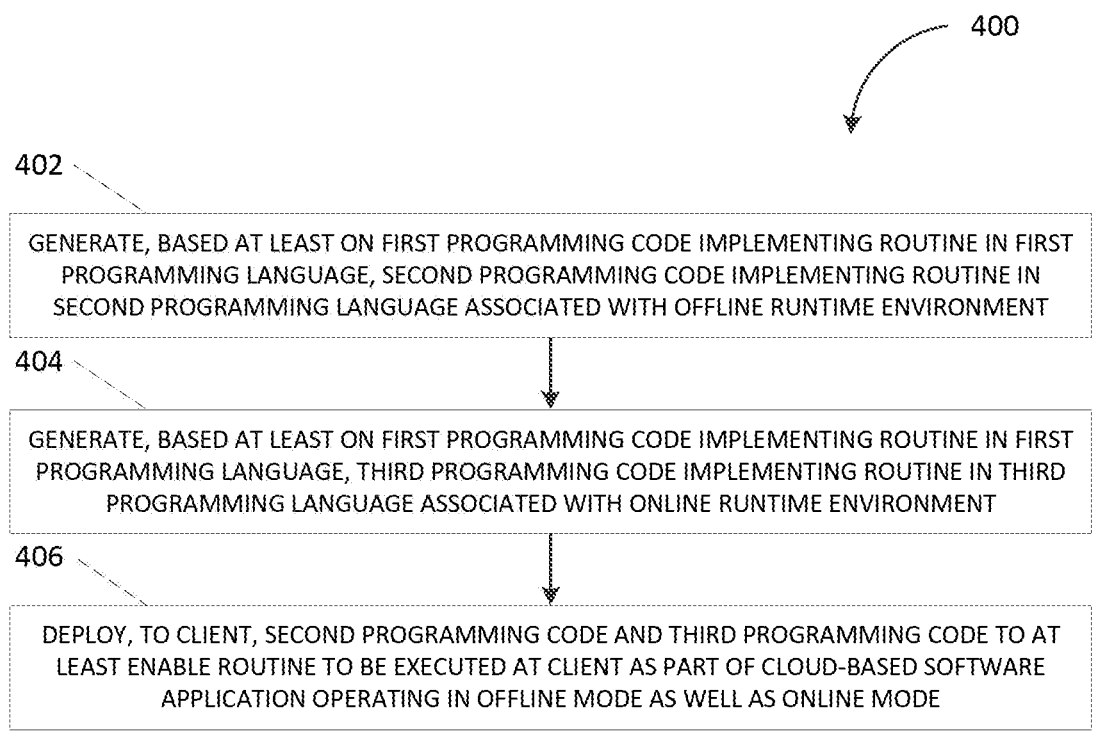
FIG. 4 depicts a flowchart illustrating a process for generating an offline runtime environment for a cloud-based software application, in accordance with some example embodiments.

FIG. 4 depicts a flowchart illustrating a process 400 for generating programming code for offline operation of a cloud-based software application, in accordance with some example embodiments. Referring to FIGS. 1, 2A-C, 3A-C, and 4, the process 400 may be performed by the deployment engine 110 in order to generate, based at least on a first programming code implementing a routine in a first programming language, a second programming code implementing the routine in a second programming language for offline execution as well as a third programming code implementing the routine in a third programming language for online execution.

At 402, the deployment controller 110 may generate, based at least on a first programming code implementing a routine in a first programming language, a second programming code implementing the routine in a second programming language associated with an offline runtime environment. For example, the deployment controller 110 may generate, based at least on a first programming code implementing a routine in an Advanced Business Scripting Language (ABSL), a second programming code implementing the routine in JavaScript for execution in an offline runtime environment (e.g., an JavaScript runtime environment and/or the like) running at the client 120. The routine may be a sequence of programming code that may be executed, for example, at the client 120, to realize one or more functionalities for the application 125. Moreover, the routine may include one or more operations, at least some of which being incapable of being performed in an offline mode where the a network connection is unavailable to provide access to one or more remote resources (e.g., data storage, computing power, and/or the like) at the remote platform 130.

In some example embodiments, the compiler 150 at the deployment engine 110 may be configured to identify the one or more operations that are incapable of being performed in the offline mode. For example, as part of parsing the first programming code implementing the routine, the compiler 150 may determine, based at least on a black list of operations that cannot be performed in the offline mode and/or a white list of operations that can be performed in the offline mode, whether each operation included in the first programming code may be performed while the application 125 in the offline mode. Operations that are identified as being incapable of being performed in the offline mode may be excluded from the second programming code which, as noted, implements the routine in the second programming language (e.g., JavaScript and/or the like) for execution in an offline runtime environment (e.g., a JavaScript runtime environment and/or the like).

At 404, the deployment controller 110 may generate, based at least on the first programming code implementing the routine in a first programming language, a third programming code implementing the routine in a third programming language associated with an online runtime environment. In some example embodiments, because the compiler 150 is able to differentiate between operations that can be performed in the offline mode and operations that cannot be performed in the offline mode, the same first programming code implementing the routine in the first programming language may be used to generate the second programming code implementing the routine in the second programming language for offline execution as well as the third programming code implementing the routine in the third programming language for online execution. For example, in addition to generating the second programming code in JavaScript, the compiler 150 may further generate, based at least on the first programming code implementing the routine in an Advanced Business Scripting Language (ABSL), the second programming code implementing the routine in an Advanced Business Application Programming (ABAP) language for execution in an online runtime environment (e.g., an Advanced Business Application Programming (ABAP) runtime environment and/or the like) running at the backend platform 130. It should be appreciated that the third programming code may include operations that are capable of being performed in the offline mode as well as operations that are incapable of being performed in the offline mode.

At 406, the deployment engine 110 may deploy, to a client, the second programming code and the third programming code to at least enable the routine to be executed at the client as part of a cloud-based software application operating in the offline mode as well as in the online mode. For example, the deployment engine 110 may deploy to the client 120, the second programming code implementing the routine in JavaScript to at least enable the routine to be executed at the client 120 as part of the application 125 even while the application 125 is operating in the offline mode. Alternatively and/or additionally, the deployment engine 110 may deploy, to the client 120, the third programming code implementing the routine in an Advanced Business Application Programming (ABAP) language to at least enable the routine to be executed at the client 120 as part of the application while the application 125 is operating in the online mode.

Figure 5:
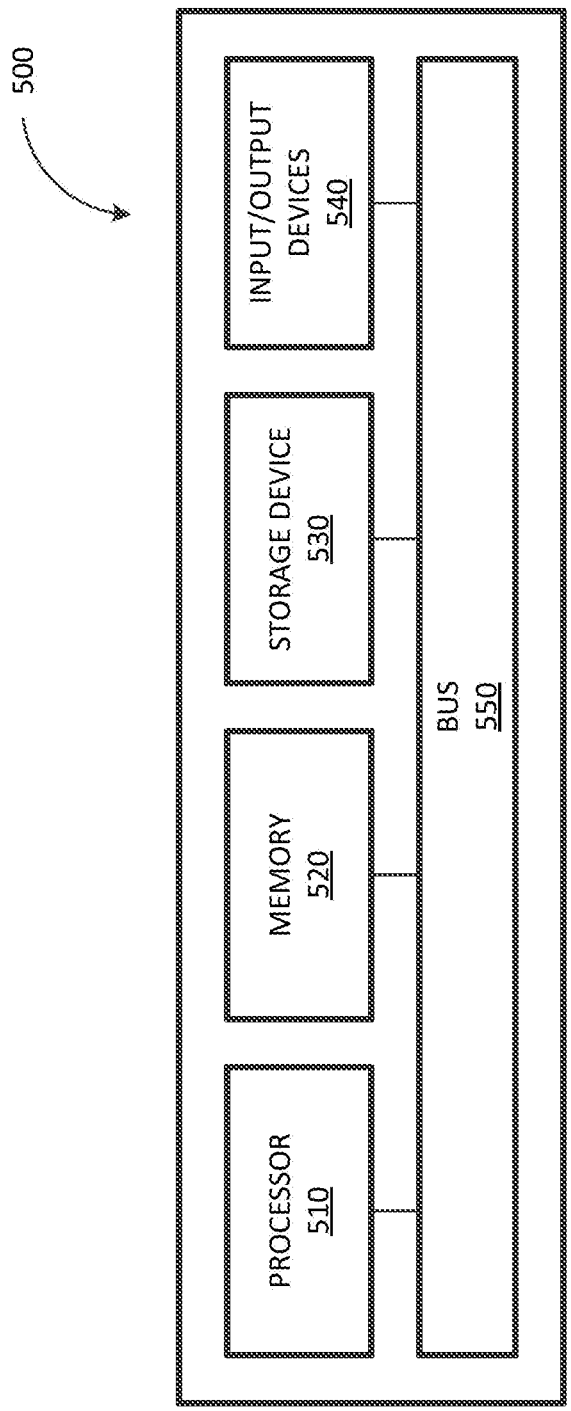
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the deployment engine 110 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the deployment engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or any other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   generating, based at least on a first programming code implementing a routine in a first programming language, a second programming code implementing the routine in a second programming language associated with an offline runtime environment, the routine including a first operation and a second operation associated with a cloud-based software application, the first operation being capable of being performed while the cloud-based software application is operating in an offline mode, the second operation being incapable of being performed while the cloud-based software application is operating in the offline mode, the second programming code being generated to include the first operation based at least on a white list identifying the first operation as being capable of being performed in the offline mode, and the second programming code further being generated to exclude the second operation; and
   deploying, to a client, the second programming code to at least enable the routine to be executed at the client as part of the cloud-based software application operating in the offline mode.

2. The system of claim 1, wherein the second programming code is generated to exclude the second operation based at least on a black list identifying the second operation as incapable of being performed in the offline mode.

3. The system of claim 1, wherein the first programing language comprises an Advanced Business Scripting Language (ABSL).

4. The system of claim 1, wherein the second programming language comprises JavaScript, and wherein the offline runtime environment comprises a JavaScript runtime environment.

5. The system of claim 1, further comprising:
generating, based at least on the first programming code implementing the routine in the first programming language, a third programming code implementing the routine in a third programming language associated with an online runtime environment; and
deploying, to the client, the third programming code to at least enable the routine to be executed at the client as part of the cloud-based software application operating in an online mode.

6. The system of claim 5, wherein the third programming language comprises an Advanced Business Application Programming (ABAP) language, and wherein the online runtime environment comprises an Advanced Business Application Programming (ABAP) runtime environment.

7. The system of claim 1, wherein a network connection to access one or more remote resources is not required while the cloud-based software application is operating in the offline mode.

8. The system of claim 1, wherein the first operation comprises an arithmetic operation, a logical operation, a programming operation, and/or an enterprise specific operation.

9. The system of claim 1, wherein the second programming code is generated as part of compiling the first programming code.

10. A computer-implemented method, comprising:
generating, based at least on a first programming code implementing a routine in a first programming language, a second programming code implementing the routine in a second programming language associated with an offline runtime environment, the routine including a first operation and a second operation associated with a cloud-based software application, the first operation being capable of being performed while the cloud-based software application is operating in an offline mode, the second operation being incapable of being performed while the cloud-based software application is operating in the offline mode, the second programming code being generated to include the first operation based at least on a white list identifying the first operation as being capable of being performed in the offline mode, and the second programming code further being generated to exclude the second operation; and
deploying, to a client, the second programming code to at least enable the routine to be executed at the client as part of the cloud-based software application operating in the offline mode.

11. The method of claim 10, wherein the second programming code is generated to exclude the second operation based at least on a black list identifying the second operation as incapable of being performed in the offline online mode.

12. The method of claim 10, wherein the first programing language comprises an Advanced Business Scripting Language (ABSL), wherein the second programming language comprises JavaScript, and wherein the offline runtime environment comprises a JavaScript runtime environment.

13. The method of claim 10, further comprising:
generating, based at least on the first programming code implementing the routine in the first programming language, a third programming code implementing the routine in a third programming language associated with an online runtime environment; and
deploying, to the client, the third programming code to at least enable the routine to be executed at the client as part of the cloud-based software application operating in an online mode.

14. The method of claim 13, wherein the third programming language comprises an Advanced Business Application Programming (ABAP) language, and wherein the online runtime environment comprises an Advanced Business Application Programming (ABAP) runtime environment.

15. The method of claim 10, wherein a network connection to access one or more remote resources is not required while the cloud-based software application is operating in the offline mode.

16. The method of claim 10, wherein the first operation comprises an arithmetic operation, a logical operation, a programming operation, and/or an enterprise specific operation.

17. The method of claim 10, wherein the second programming code is generated as part of compiling the first programming code.

18. A non-transitory computer readable medium storing instructions, which when executed by at least one data processor, result in operations comprising:
generating, based at least on a first programming code implementing a routine in a first programming language, a second programming code implementing the routine in a second programming language associated with an offline runtime environment, the routine including a first operation and a second operation associated with a cloud-based software application, the first operation being capable of being performed while the cloud-based software application is operating in an offline mode, the second operation being incapable of being performed while the cloud-based software application is operating in the offline mode, the second programming code being generated to include the first operation based at least on a white list identifying the first operation as being capable of being performed in the offline mode, and the second programming code further being generated to exclude the second operation; and
deploying, to a client, the second programming code to at least enable the routine to be executed at the client as part of the cloud-based software application operating in the offline mode.

* * * * *